United States Patent [19]

Blount-Gillette

[11] Patent Number: 5,078,763
[45] Date of Patent: Jan. 7, 1992

[54] AIR FILTER CLEANING DEVICE

[76] Inventor: James E. Blount-Gillette, 1830 Nicklaus Dr., Unit D, Tallahassee, Fla. 32301

[21] Appl. No.: 654,937

[22] Filed: Feb. 13, 1991

[51] Int. Cl.$^5$ .............................................. B01D 46/04
[52] U.S. Cl. ....................................... 55/302; 15/304
[58] Field of Search .................... 55/301, 302; 15/304; 210/411; 134/22.18, 144, 151, 198

[56] References Cited

U.S. PATENT DOCUMENTS

| | | | |
|---|---|---|---|
| 3,044,475 | 7/1962 | Thompson | 15/304 X |
| 3,538,926 | 11/1970 | Nesbitt | 15/304 X |
| 3,733,639 | 5/1973 | Timian | 15/304 |
| 3,958,296 | 5/1976 | Fell | 55/302 X |
| 4,280,826 | 7/1981 | Johnson, Jr. | 55/302 |
| 4,492,003 | 1/1985 | Boylan | 55/302 X |
| 4,514,875 | 5/1985 | Comer | 55/302 X |
| 4,810,270 | 3/1989 | Terry et al. | 55/302 X |
| 4,818,261 | 4/1989 | Beckon | 55/302 X |

*Primary Examiner*—Richard L. Chiesa
*Attorney, Agent, or Firm*—Thomas C. Saitta

[57] ABSTRACT

A device for cleaning air filters, either annular or rectangular in configuration, including a bottom plate member having a flat upper surface, an apertured vertical column connected to a high pressure air hose, and a top plate member, removable from the vertical column, having a flat bottom surface, where an annular filter is placed around the vertical column and top plate member is placed onto the vertical column, sealing the filter between the top plate member and the bottom plate member. Air is then forced into the vertical column, exiting through the apertures and through the filter itself, forcing any accumulated particles off the surface of the filter. Secondary air distributor apertures, connected to a secondary pressure hose fitting, are positioned on the upper surface of the bottom plate member for use with square or rectangular filters.

6 Claims, 1 Drawing Sheet

AIR FILTER CLEANING DEVICE

BACKGROUND OF THE INVENTION

This device relates to the field of devices for cleaning air filters by the use of forced air pressure, and more particularly relates to the field of such devices having a central air delivery system and means to retain and seal air filters within the device.

Air filters are used to prevent particulate impurities such as dust and dirt from entering into the combustion chambers of engines. A typical air filter has a filtering medium which allows for passage of air but traps the particulates on its outer surface. Filters are commonly annular with the filter medium incorporated into the cylindrical side wall. The air is drawn or forced through the filter from the outside to the inside. Additionally, filters may be square or rectangular in overall configuration, in which case the air is drawn in one side and exited out another after passing through the filtering medium.

Once the particulate build-up becomes significant, the ability of the filter to function properly is impaired and the filter may not allow sufficient air to enter the engine. In such cases, the filter either needs to be replaced or cleaned. If possible, it is preferable to clean the filter rather than replace it, both from a cost standpoint for the consumer and for the benefit of passing fewer discarded units into the waste stream, thereby reducing the land fill accumulation by hundreds of thousands of units.

In a typical service station setting, this cleaning is often performed by directing the air flow from a high pressure hose around the interior of the filter, or against the exit side of a square filter, to blow out the particulates massed on the external surface of the filter medium. This method is both ineffective and hazardous, as the filter can be easily damaged by the highly concentrated forced air. Therefore, devices have been developed to safely and easily clean filters. For example, Timian in U.S. Pat. No. 3,733,639 teaches a renovator device which uses a rotating air distributor mounted onto a vibrating plate. The components are contained in a cylindrical closed chamber and both a forced air source and a vacuum source are required. Likewise, Boylan in U.S. Pat. No. 4,492,003 teaches a cleaning unit utilizing forced air pressure. The Boylan device has a spring mounted deflector to direct the air outwardly in an even manner.

Both these devices suffer from the drawbacks of complexity in design and manufacture. Neither device can be used with a non-tubular air filter. It is an object of this invention to provide a simple air cleaning device which effectively distributes the air pressure around the entire inner surface of the tubular filter being cleaned. It is a further object to provide such a device which can also clean square or rectangular filters.

SUMMARY OF THE INVENTION

The invention is an air filter cleaning device comprising a vertical column fixedly attached to a bottom plate. A removable top plate having a central opening corresponding in size to the outer diameter of the vertical column is mounted onto the vertical column. The vertical column has an interior conduit connecting a pressure hose fitting on the top of the column to a number of apertures evenly distributed on all sides of the lower portion of the vertical column. Additionally, the bottom plate may have another set of perforations distributed in a generally square or rectangular pattern. Another conduit connects a pressure fitting in the bottom plate to these apertures.

DETAILED DESCRIPTION OF THE PREFERRED EMBODIMENT

Figure 1:
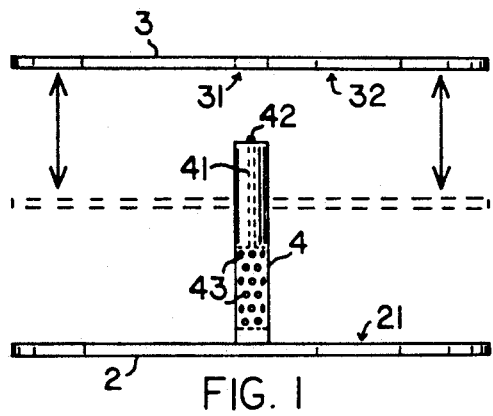
FIG. 1 a side view of the invention showing the top plate removed.

The invention generally comprises a bottom plate member 2, a top plate member 3 and a vertical column 4, as shown in FIG. 1. The bottom plate member 2 has a flat upper surface 21 and is preferably a circular disk. The vertical column 4 is connected to the bottom plate member 2 at the center point, such that column 4 is perpendicular to the upper surface 21 of bottom plate member 2. Column 2 is preferably cylindrical, but other shapes are also possible.

Top plate member 3 has a centrally located aperture 31 corresponding in size and shape to the outer dimensions of column 4, such that top plate member 3 can be slidingly placed onto and removed completely from column 4. The top plate aperture 31 must fit relatively tightly around column 4 to prevent the egress of air through this location. Top plate member 3 has a flat bottom surface 32, and top plate member 3 is also preferably a circular disk.

Figure 2:
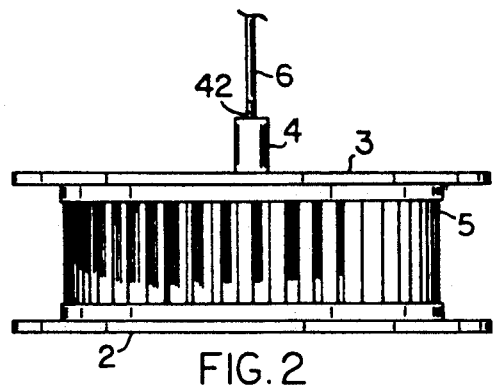
FIG. 2 is side view showing a tubular air filter in place within the invention for cleaning.
Figure 3:
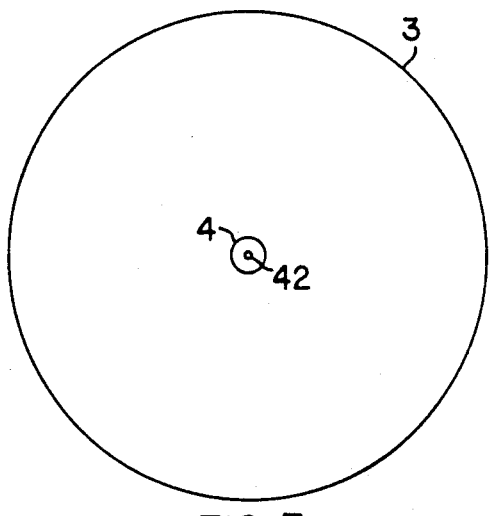
FIG. 3 is a top view of the invention.

Vertical column 4 has a hollow interior or conduit 41 which connects a pressure hose fitting 42 attached to the top of column 4 to a number of air distributor apertures 43. Air distributor apertures 43 are distributed relatively evenly around the circumference of the lower portion of column 4. The air distributor apertures 43 extend only a short distance up column 4, so that these apertures 43 will not be located at a height greater than that of a given filter 5 being cleaned, as seen in FIG. 2. The air distribution apertures 43 are the only means of egress for air forced into conduit 41, the bottom of column 4 being sealed by bottom plate member 2. Pressure hose fitting 42 is of any standard type suitable for making a secure, yet detachable, connection with an air hose 6.

To use the invention to clean a tubular air filter 5, the filter 5 is placed onto bottom plate member 2 such that it surrounds column 4, as seen in FIG. 2. The air filter 5 sits flush against the flat upper surface 21 of bottom plate member 2, such that an air-tight seal is formed. Top plate member 3 is then placed onto column 4 such that the flat bottom surface 32 rests against the upper surface of filter 5, also forming an air-tight seal. An air hose 6, which is connected to a source of high pressure air such as a compressor, is now connected to column 4 at the pressure hose fitting 42. Pressurized air is then forced into conduit 41 of column 4. This air exits through air distributor apertures 43 in an evenly distributed manner, such that the pressure against the interior surface of filter 5 is the same at any given location. This air then passes through filter 5, since the upper and lower openings of the filter 5 are sealed by top plate member 3 and bottom plate member 2, respectively, causing the dirt and dust particulates accumulated on the exterior surface of the filter 5 to be dispersed. Once the filter 5 is sufficiently cleaned, the air hose 6 is disconnected from fitting 42, the top plate member 3 is removed from column 4, and the filter 5 can now be reused.

Figure 4:
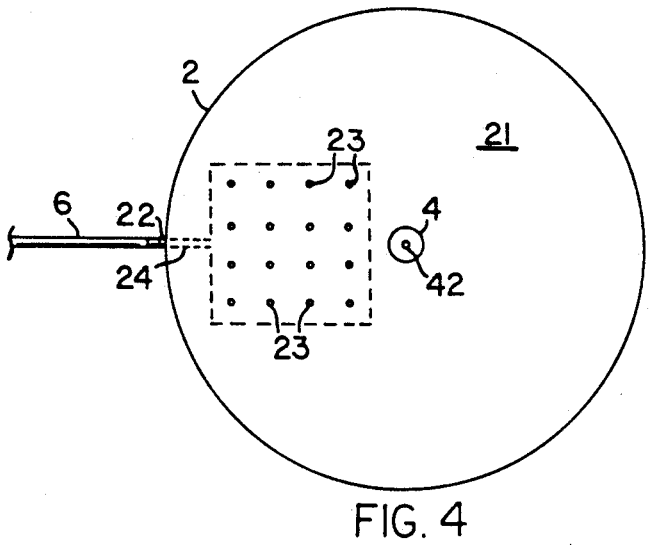
FIG. 4 is a view of the upper surface of the bottom plate showing the apertures for use with a square or rectangular filter.

To greatly expand the capabilities and usefulness of the invention, an additional embodiment is shown in FIG. 4. Many air filters in modern vehicles are square or rectangular rather than annular. The air is drawn through one side of the filter and passed out through another side. To account for cleaning of these type of filters, bottom plate member 2 is provided with a set of secondary air distributor apertures 23 connected by secondary conduit mean 24 to a secondary pressure hose fitting 22. These secondary air distributor apertures 23 are preferably positioned in a square or rectangular pattern, such that a square or rectangular filter can be held against the flat upper surface 21 of bottom plate member 2 to cover all the secondary air distributor apertures 23, forming an air-tight seal, and air from pressure hose 6 forced out of the secondary air distributor apertures 23 to dislodge the dirt and dust particulates encased in this filter. The particular location, number and configuration of the secondary air distributor apertures 23 and secondary pressure hose fitting 22 may vary as a matter of design choice.

It can be seen that obvious substitutions and equivalents may be obvious to one skilled in the art, and the above examples are by way of illustration only. The full scope and definition of the invention is to be a set forth in the following claims.

I claim:

1. A device for cleaning air filters, comprising a bottom plate member having a flat upper surface, a top plate member having a flat bottom surface, and a vertical column fixedly attached directly to and perpendicular to said flat upper surface of said bottom plate member, said vertical column having air distributor apertures on its surface connected by conduit means within said vertical column to a pressure hose fitting means, said top plate member having an aperture corresponding to said vertical column, such that said top plate member may be slidingly positioned on said vertical column, and where said top plate member is removably attachable to said vertical column whereby said flat upper surface of said bottom plate member and said flat bottom surface of said top plate member form an airtight seal with an annular air filter placed around said vertical column, whereby air enters said vertical column through said pressure hose fitting means, travels through said conduit means, exits said vertical column through said air distributor apertures, and exits only between said top plate member and said bottom plate member through said annular filter.

2. The device of claim 1, where said air distributor apertures are located on the lower portion of said vertical column.

3. The device of claim 1, where said air distributor apertures are evenly distributed around said vertical column.

4. A device for cleaning air filters, comprising a bottom plate member having a flat upper surface, a top plate member having a flat bottom surface, and a vertical column attached perpendicular to said flat upper surface of said bottom plate member, said vertical column having air distributor apertures connected by conduit means to a pressure hose fitting means, said top plate member removably attachable to said vertical column whereby said flat upper surface of said bottom plate member and said flat bottom surface of said top plate member form an air-tight seal with an annular air filter placed around said vertical column, whereby air enters said vertical column through said pressure hose fitting means, travels through said conduit means, exits said vertical column through said air distributor apertures, and exits only between said top plate member and said bottom plate member through said annular filter; and further comprising secondary air distributor apertures located on said flat upper surface of said bottom plate member, a secondary pressure hose fitting means and a secondary conduit means connecting said secondary pressure hose fitting means to said secondary air distributor apertures.

5. The device of claim 4, where said secondary air distributor apertures are positioned in a rectangular configuration.

6. The device of claim 4, where said secondary air distributor apertures are positioned in a square configuration.

* * * * *